United States Patent
Lim et al.

(10) Patent No.: US 8,996,007 B2
(45) Date of Patent: Mar. 31, 2015

(54) METHOD AND APPARATUS FOR REASSIGNING FREQUENCY RESOURCE IN A FEMTO BASE STATION DURING HANDOVER

(75) Inventors: Jae-Won Lim, Anyang-si (KR); Seo-Woo Jang, Anyang-si (KR); Jun-Ho Jo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 206 days.

(21) Appl. No.: 13/395,427

(22) PCT Filed: Sep. 11, 2009

(86) PCT No.: PCT/KR2009/005162
§ 371 (c)(1),
(2), (4) Date: May 24, 2012

(87) PCT Pub. No.: WO2011/030940
PCT Pub. Date: Mar. 17, 2011

(65) Prior Publication Data
US 2012/0238273 A1     Sep. 20, 2012

(51) Int. Cl.
*H04W 36/00*    (2009.01)
*H04W 72/00*    (2009.01)
*H04W 16/04*    (2009.01)
H04W 36/08     (2009.01)
H04W 16/10     (2009.01)
H04W 84/04     (2009.01)

(52) U.S. Cl.
CPC .............. *H04W 16/04* (2013.01); *H04W 36/08* (2013.01); *H04W 16/10* (2013.01); *H04W 84/045* (2013.01)

USPC ........... 455/436; 455/437; 455/438; 455/439; 455/450; 455/452.1; 455/452.2; 455/453; 370/331; 370/329; 370/341

(58) Field of Classification Search
CPC ... H04W 84/045; H04W 36/08; H04W 36/30; H04W 72/04; H04W 72/0406
USPC ................ 455/436–444, 450–455, 464, 509; 370/329, 336, 341, 331–334
See application file for complete search history.

(56) References Cited

U.S. PATENT DOCUMENTS

| | | | |
|---|---|---|---|
| 8,155,659 B2* | 4/2012 | Kazmi et al. | 455/452.2 |
| 2003/0117956 A1* | 6/2003 | Lee | 370/232 |
| 2008/0293418 A1 | 11/2008 | Choksi et al. | |
| 2009/0036133 A1 | 2/2009 | Kim et al. | |
| 2009/0046665 A1 | 2/2009 | Robson et al. | |
| 2009/0129341 A1 | 5/2009 | Balasubramanian et al. | |
| 2009/0299788 A1* | 12/2009 | Huber et al. | 705/7 |
| 2010/0003985 A1* | 1/2010 | Jang et al. | 455/436 |
| 2010/0046654 A1* | 2/2010 | Ode et al. | 375/260 |

* cited by examiner

*Primary Examiner* — Allahyar Kasraian
(74) *Attorney, Agent, or Firm* — Lee, Hong, Degerman, Kang & Waimey

(57) ABSTRACT

The present invention relates to an apparatus and method for arbitrating radio resources between femto base stations in which, when handover of a terminal takes place between femto base stations, the handover is carried out by reallocating radio resources of a serving femto base station assigned to the terminal to a target femto base station, to rearbitrate the radio resources and reduce the time required for rearbitration, thereby enhancing communication effectiveness.

9 Claims, 4 Drawing Sheets

Fig. 1 – Prior Art –

METHOD AND APPARATUS FOR REASSIGNING FREQUENCY RESOURCE IN A FEMTO BASE STATION DURING HANDOVER

CROSS-REFERENCE TO RELATED APPLICATIONS

This application is the National Stage filing under 35 U.S.C. 371 of International Application No. PCT/KR2009/005162, filed on Sep. 11, 2009, the content of which is incorporated by reference herein in its entirety.

TECHNICAL FIELD

The present invention relates to an apparatus and method for arbitrating radio resources between femto base stations in which, when handover takes place between the femto base stations by terminal movement in a femto base station, the handover is carried out, and more particularly, to a method and apparatus for reassigning radio resources between femto base stations in which user equipment searches a femto base station to be accessed, thereby carrying out handover around the user equipment, a femto base station controller, and a core network.

BACKGROUND ART

A femto base station refers to a subminiature mobile communication base station that accesses to a mobile communication core network through a broadband network installed within a building, such as a home or an office. In case of within a building, the coverage of a macro base station may be limited by an outer wall of the building, or the like, but in case where a femto base station is installed indoors in such an environment, it is possible to expand the coverage and enhance voice quality. Also, it has an advantage of effectively providing a convergence service between high-bandwidth wired and wireless lines.

The femto base station can be divided into a CSG (closed subscriber group) femto base station, and an open access femto base station based upon whether or not user equipment is accessible to the femto base station. In case of a CSG femto base station, the femto base station is accessible only by user equipment for which a service is allowed to the relevant femto base station, but in case of an open access femto base station, the femto base station is unrestrictedly accessible by any user equipment for which the femto base station provides a service. In particular, a femto base station white list is defined in 3GPP, and therein are stored CSG IDs for checking that the relevant femto base station is a CSG femto base station, and a CSG ID list for the relevant terminal to access to a USIM (universal subscriber identity module) card of a femto base station supporting terminal.

As a result, when the femto base station accessible during terminal movement is an open access or CSG femto base station but the terminal is allowed to access, handover is carried out to receive a high-bandwidth mobile communication service.

FIG. 1 is a structured diagram illustrating a mobile communication environment in which a femto base station is installed within the coverage of a macro base station as a prior art.

In FIG. 1, the base station included in a mobile communication system can be divided into femto base stations 120, 130 and a macro base station 100 based upon the cell coverage or deployment method. The coverage of femto base stations 120, 130 has a smaller size than that of the coverage of macro base station 100. All or part of the coverage of femto base stations 120, 130 may overlap with the coverage of macro base station 100. User equipment (UE) 110 within the macro base station 100 generally performs a communication with the macro base station 100, and the macro base station 100 is connected to a mobile communication core network 160 by a dedicated line However, when the femto base station 120 is deployed in a closed position to the user equipment 110, that is, when the user equipment 110 is deployed in the coverage of the femto base station 120, the user equipment 110 performs a communication with the femto base station 120. The femto base station is connected to a femto base station controller 150 by a wired line through a broadband network 140, and the femto base station controller 150 is connected to the mobile communication core network 160.

When another femto base station 130 is searched out while the user equipment 110 is moving in the femto base station 120 being communicated to each other, it is first determined whether or not the terminal is accessible to the searched femto base station 130, and CSG IDs being periodically transmitted from the femto base station are checked in case of a CSG femto base station, and then, if the relevant femto base station is registered in the white list of the user equipment 110, the a signal quality of the relevant femto base station 130 is checked, and handed over if the signal quality is good.

However, the number of terminals simultaneously accessible to a femto base station is typically a few, about 3 to 5, and therefore, the ratio occupied by a terminal in the overall traffic amount of a femto base station is very high. Accordingly, a frequency resource amount required by the femto base station may be greatly varied during the handover of a terminal.

Accordingly, when a conventional terminal handover method is used by considering only a signal quality of the femto base station to be moved, it may happen to exceed the number of accessible terminals or have insufficient radio resources required for communicating with terminals by the relevant femto-cell if many terminals have been already accessed to the relevant femto base station to be moved by a terminal; on the contrary, it may happen to waste radio resources if not so many terminals are accessed to the femto base station currently accessed by a terminal.

To solve such a problem, there is a method for rearbitrating a frequency resource assignment amount between femto base stations assigned by a femto base station controller or core network, based upon a number of terminals connected to the femto base station and an amount of traffic, to reduce radio resources, but the method has a disadvantage of consuming a relatively long time because the deployed femto base station controller or core network become a subject to search all femto base stations even a femto base station for which resource assignment is not required, and implement a radio resource reallocation by considering all the factors, such as the number of terminals connected to each femto base station, the amount of traffic, and the interference between femto-cells. Moreover, the method has a disadvantage that it is difficult to cope with the situation frequently occurred locally for a short period of time, such as the handover of a terminal between femto-cells, since the radio resources assignment for a femto-cell by the femto base station controller is carried out with a relatively long period and the radio resources are reassigned during a specific event such as femto-cell installation or the like.

As a result, there is a need to rearbitrate frequency resources that have been already assigned between the relevant femto base stations only for the femto base stations required for reallocating radio resources, that is, the serving femto-cell to which a terminal has been previously accessed and the target femto-cell to which a terminal will be handed over, thereby reducing the time consumed for reallocating radio resources as well as effectively using the radio resources.

DISCLOSURE OF INVENTION

Solution to Problem

As seen from the foregoing technology in the related art, the ratio occupied by a terminal in the overall traffic amount of a femto base station is very high because the femto base station provides a service for a small number of terminals, for example, approximately 3 to 5, compared to a typical base station. Accordingly, when a terminal tries to access to another femto base station from a femto base station currently being accessed, it is necessary to effectively reallocate previously assigned radio resources between femto base stations in a short time, thereby effectively managing the radio resources.

Also, when a terminal is handed over to an accessible neighboring femto base station, in case of using a conventional method in which handover is carried out only by considering signal intensity, it may cause a problem that the QoS (Quality of Service) serviced by the previous femto base station will not be satisfied due to insufficient radio resources provided by the femto base station into which the terminal is moved after handover.

As a result, in order to overcome the restriction of the foregoing technology in the related art, an object of the invention is to reallocate radio resources between the relevant femto base stations when a terminal tries to hand over from a serving femto base station that has been accessed to a target femto base station.

In order to accomplish the foregoing object, the present invention provides a method and apparatus for reallocating radio resources during handover of a terminal in a femto base station.

In a method for arbitrating radio resources assigned to one or a plurality of terminals in a femto base station, the method includes allocating and assigning its own radio resources to the one or plurality of terminals by the femto base station to provide a communication service, transmitting information on a radio resource assigned to the terminal to a network entity or transmitting directly to a target femto-cell through the terminal by the femto base station when a specific terminal among the one or plurality of terminals is handed over from the femto base station to a target femto base station, and excluding the radio resource determined by a network entity or the radio resource assigned to the terminal from the its own radio resources by the femto base station when the specific terminal is handed over to the target femto base station. Here, the network entity indicates an MME of the femto base station controller or core network for controlling a femto base station.

Furthermore, in a method for arbitrating radio resources assigned to one or a plurality of terminals in a femto base station, the method includes allocating and assigning its own first radio resource to the one or plurality of terminals by the femto base station to provide a service, receiving a message for requesting handover to a specific terminal accessed to a neighboring femto base station, receiving information on a second radio resource of the neighboring femto base station assigned to the specific terminal by the neighboring femto base station or determined by a network entity, and expanding an operating frequency into the second radio resource to provide a communication service for the specific terminal after handover, in addition to the previously assigned first radio resource by the femto base station.

In addition, in a terminal to be handed over from a serving femto base station to a target femto base station, the apparatus includes a transceiver unit, and a control unit for controlling the transceiver unit, when handed over to the target femto base station, to receive information on a radio resource assigned by the serving femto base station, and request for expanding a radio resource required during handover to the target femto base station based upon the information on the radio resource, and then perform a handover to the target femto base station.

Advantageous Effects of Invention

In performing the handover of a terminal from a previously accessed femto base station to another accessible femto base station, the terminal searches a femto base station to be accessed, and the terminal, a femto base station controller, and a core network become a subject to reallocate previously assigned radio resources between femto base stations in which handover takes place, thereby having an effect of reducing the time consumed for reallocating radio resources as well as effectively using the radio resources.

MODE FOR THE INVENTION

Figure 1:
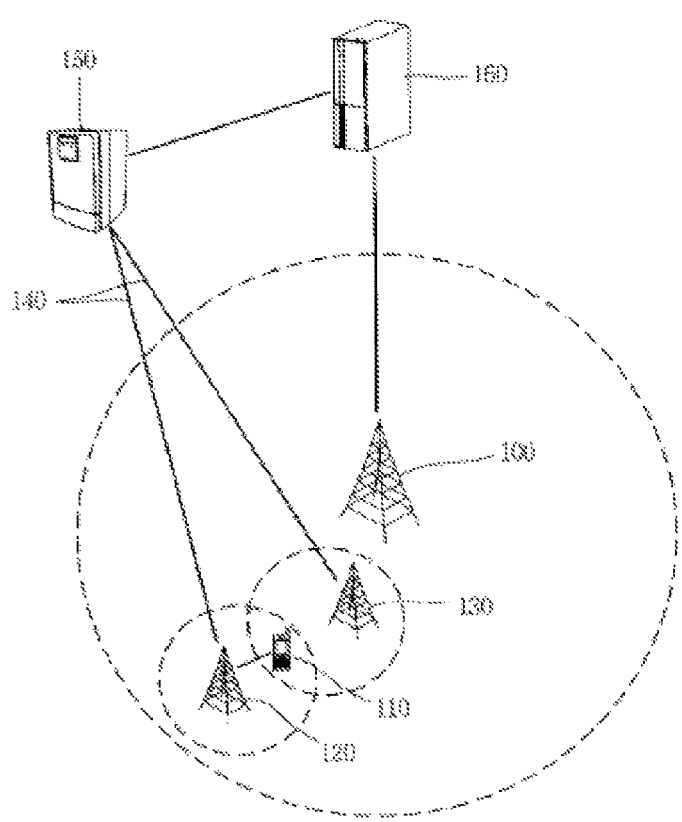
FIG. 1 is a structured diagram illustrating a mobile communication environment in which a femto base station is installed within the coverage of a macro base station as a prior art.

Hereinafter, a preferred embodiment of the present invention will be described in detail with reference to the accompanying drawings. First, it should be noted that the same symbol is given to the same procedure and constituent element as much as possible even though it is shown in other drawings, with regard to adding a reference numeral to each procedure in a sequence diagram of each drawing or adding reference numerals to constituent elements in the drawing. Moreover, many specific detailed matters are shown in the following explanation, but they are provided only to help more general understanding of the present invention, and it is apparent to a person skilled in the art that the present invention can be carried out without those specific detailed matters. Also, in describing the invention, well-known functions or constructions will be not described in detail if they would obscure the gist of the invention in unnecessary detail.

The technology below will be used for various mobile communication systems such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), or the like. CDMA can be implemented using a radio technology such as UTRA (Universal Terrestrial Radio Access) or CDMA2000. TDMA can be implemented using a radio technology such as GSM (Global System for Mobile communication)/GPRS (General Packet Radio Service)/EDGE (Enhanced Data Rates for GSM Evolution). OFDMA can be implemented using a radio technology such as IEEE 802.11 (Wi-Fi), IEEE 802.16 (WiMAX), IEEE 802.20, E-UTRA (Evolved UTRA), or the like.

UTRA is part of UMTS (Universal Mobile Telecommunication System). 3GPP (3rd Generation Partnership Project) LTE (Long Term Evolution), as part of E-UMTS (Evolved UMTS) that uses E-UTRA, employs OFDMA in the downlink and employs SC-FDMA in the uplink. LTE-A (LTE-Advanced) is an evolution of LTE.

User equipment (UE) can be fixed or mobile, and may be called other terms, such as MS (Mobile Station), UT (User equipment), SS (Subscriber Station), wireless device, PDA (Personal Digital Assistant), wireless modem, handheld device, and the like. Base station (BS) is generally referred to as a fixed station that communicates with a terminal, and may be called other terms, such as eNB (evolved-NodeB), BTS (Base Transceiver System), access point, and the like. Also, femto base station may be called other terms, such as femto-cell, home node-B, CSG (Closed Subscriber Group) cell, and the like. Macro base station may be called macro-cell by differentiating from femto-cell.

Hereinafter, the present invention will be described in detail with reference to the accompanying drawings.

The present invention relates to a method for reallocating the radio resources of a previously serviced femto base station to a femto base station to be accessed during a handover procedure in which a terminal accessed to a femto base station accesses to another femto base station.

Figure 2:
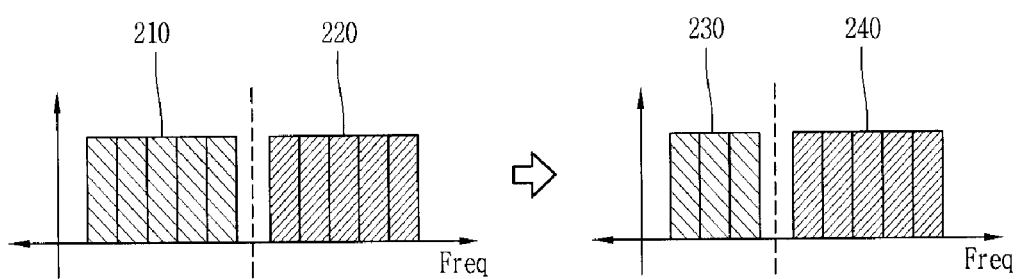
FIG. 2 is a view illustrating a concept of reallocating radio resources between femto base stations when a terminal is handed over according to an embodiment of the present invention.

FIG. 2 is a view illustrating a concept of reallocating radio resources between femto base stations when a terminal is handed over according to an embodiment of the present invention.

In FIG. 2, as an embodiment of the present invention, a serving femto base station 210 and a target femto base station 220 respectively use five assigned RBs (resource blocks). When available radio resources are insufficient in a femto base station to be accessed during handover of a terminal, a problem may be caused that, although it is handed over to a new femto base station, a newly accessed femto base station cannot satisfy the QoS provided by a previous femto base station, and therefore, the radio resources of the previously accessed femto base station will be reallocated to a newly accessed femto base station. In FIG. 2, as an example, it is illustrated that two RBs of the radio resources 230 in a serving femto base station are reallocated to a target femto base station 240.

In general, a handover procedure can be largely divided into three steps, such as 1) searching accessible neighboring femto base stations prior to handover taking place based upon movement by a terminal that has been already accessed to a serving femto base station, 2) determining handover to a target femto base station to be moved when the accessible target femto base station is searched, and 3) carrying out handover to the target femto base station by the terminal.

The present invention is characterized in that radio resources between both femto base stations are reallocated when handover is carried out from the serving femto base station to the target femto base station between the steps 2) and 3).

For the methods of reallocating radio resources in a femto base station, there are a method for reallocating radio resources through a femto base station controller, and a method for reallocating radio resources through a terminal to be handed over, and the reallocation method through a controller will be first described below.

Figure 3:
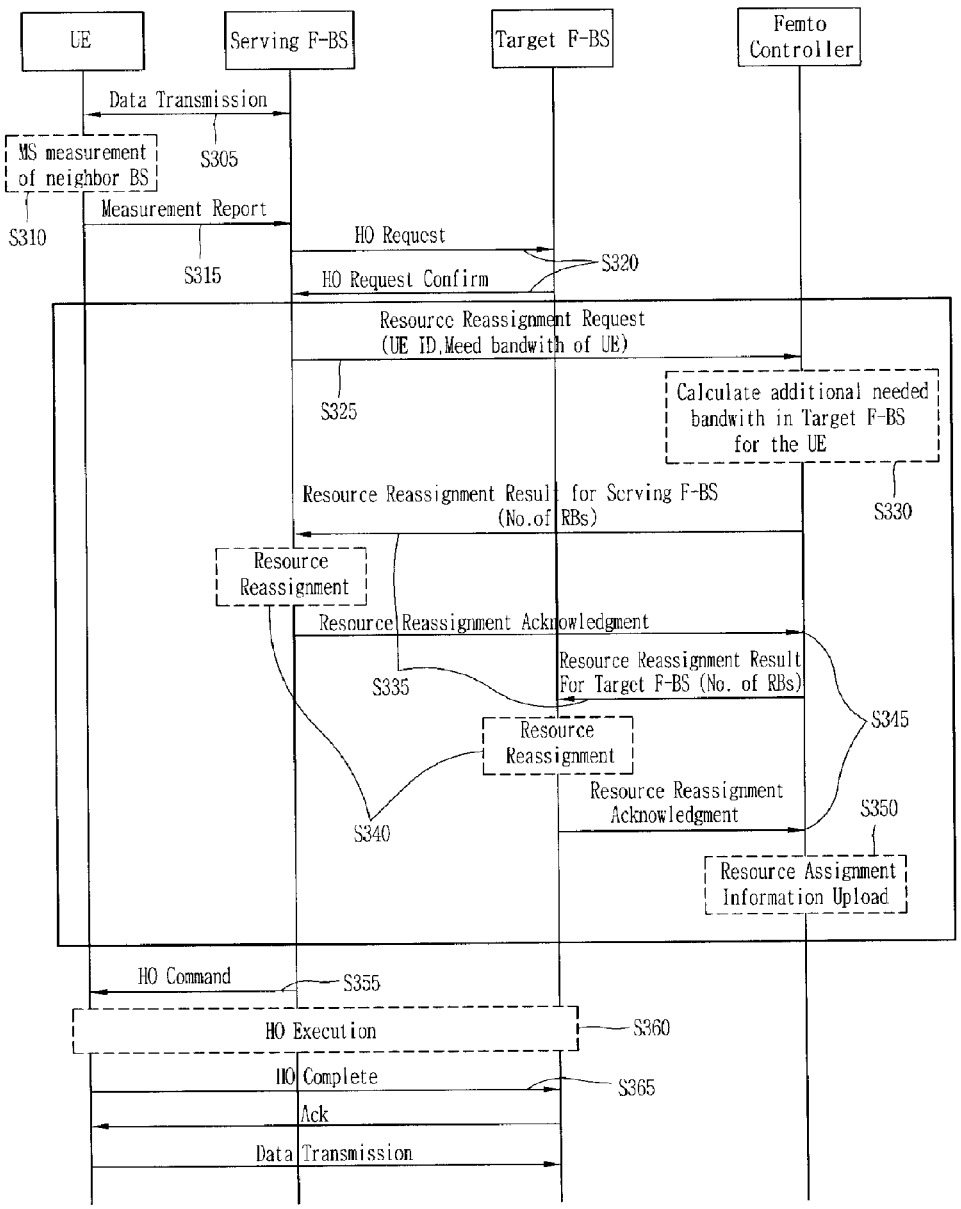
FIG. 3 is a sequence diagram illustrating a method of reallocating radio resources through a femto base station controller.

FIG. 3 is a sequence diagram illustrating a method of reallocating radio resources through a femto base station controller.

In FIG. 3, a terminal is accessed to a serving femto base station to perform a communication (S305). The terminal accessed to a serving femto base station searches whether or not there exists an open access femto base station accessible by the terminal through periodically searching neighboring femto base stations, a CSG femto base station registered in a white list, and a macro base station, and checks that the femto base station has a better signal quality than that of the currently accessed serving femto base station through checking the signal intensity (S310).

The terminal transmits a Measurement Report message by including the signal intensity of neighboring femto base stations and the information of base station IDs (S315).

The serving femto base station checks the signal quality of neighboring femto base stations and whether or not the terminal is accessible to the relevant femto base station, and then determines a target femto base station, and notifies that the relevant terminal will be handed over to the target femto base station by transmitting a HO request message to the target femto base station (S320).

Furthermore, the serving femto base station requests a radio resource reallocation by including the user equipment ID and the information of radio resource required for the user equipment, to a femto base station or core network (S325). Here, the radio resource information is referred to a size of radio resource for satisfying a QoS required by the relevant terminal.

At this time, in case where it is determined that available radio resources for satisfying a QoS of the relevant terminal to be handed over to the target femto base station are insufficient in the target femto base station when the relevant terminal is handed over to the target femto base station, the femto base station or core network calculates available radio resources to satisfy the QoS of the terminal to be handed over in the target femto base station among the radio resources assigned to the serving femto base station (S330), and the right to use radio resource is switched from the serving femto base station to the target femto base station, and transmits the change to the serving femto base station and the target femto base station, respectively (S335).

The serving femto base station and target femto base station received the change rearbitrate an operating frequency based upon this (S340). When the rearbitration of the operating frequency is finished, the serving femto base station and target femto base station transmit a message notifying that the rearbitration has been finished (Resource Reassignment Acknowledgement) to the femto base station or core network. (S345). Based upon this message, the femto base station or core network updates radio resources assignment information for the femto base stations (S350), the serving femto base station commands the terminal to hand over to the target femto base station (S355).

Based upon this command, the terminal performs handover from the serving femto base station to the target femto base station (S360), resumes communication if the handover is finished, and notifies the serving femto base station that the handover has been successfully completed (S365).

Figure 4:
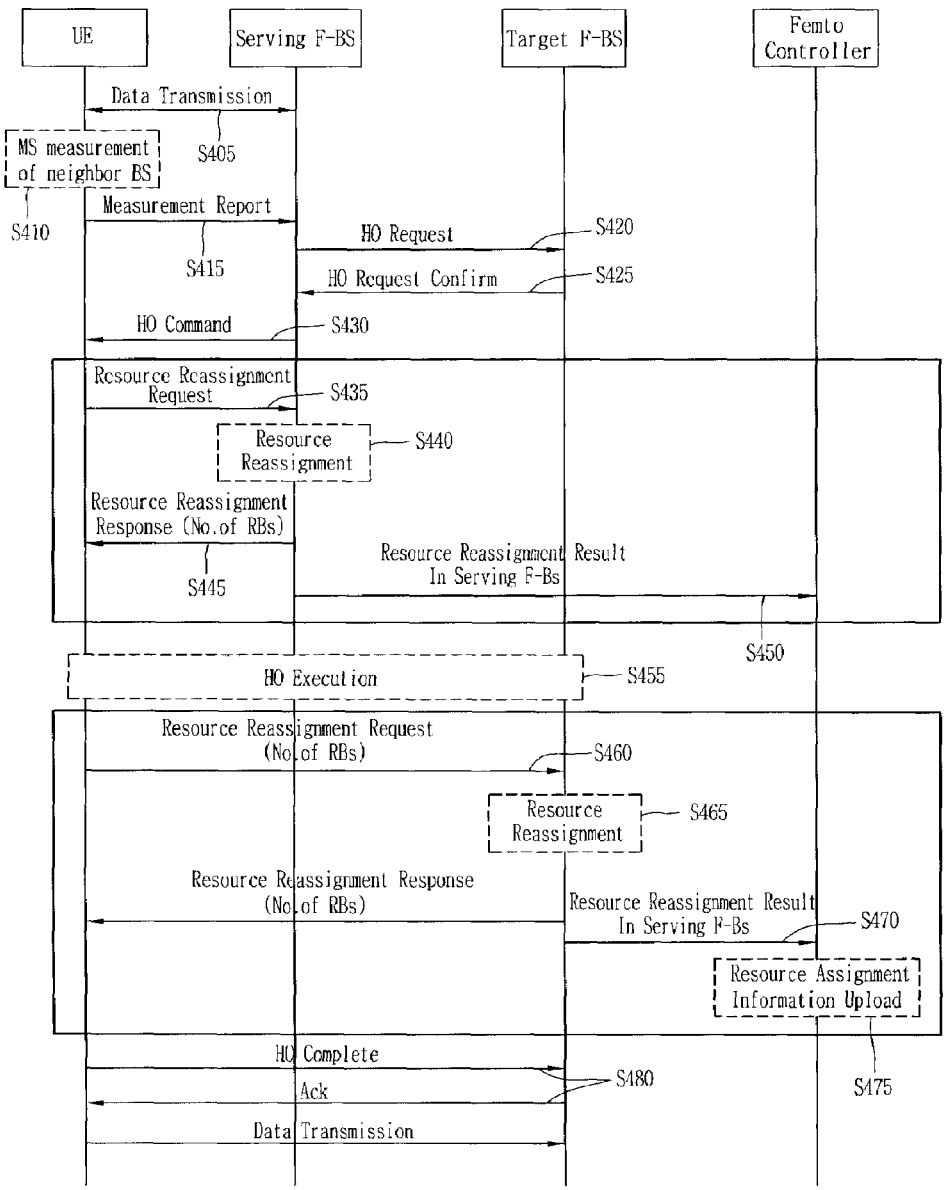
FIG. 4 is a sequence diagram illustrating a method of reallocating radio resources through a terminal to be handed over.

FIG. 4 is a sequence diagram illustrating a method of reallocating radio resources through a terminal to be handed over.

In FIG. 4, the terminal is accessed to a serving femto base station to perform a communication (S305). The terminal accessed to a serving femto base station searches whether or not there exists an open access femto base station accessible by the terminal through periodically searching neighboring femto base stations, a CSG femto base station registered in a white list, and a macro base station, and checks that the femto base station has a better signal quality than that of the currently accessed serving femto base station through checking the signal intensity (S410).

The terminal transmits a Measurement Report message by including the signal intensity of neighboring femto base stations and the information of base station IDs (S415).

The serving femto base station requests a handover to the selected target femto base station based upon the signal intensity of neighboring femto base stations and the information of base station IDs that have been received from the terminal (S420), and if there is a response from the target femto base station for the handover request (S425), then it determines the target femto base station and commands to the terminal to carry out handover (S430). At this time, in order to selectively implement a handover of the terminal in a fast speed, the serving femto base station may determine a target femto-cell using only the signal intensity and base station information, and then instructs the terminal to hand over directly without a request of handover to the target femto-cell.

For the handover command, the terminal requests information on the radio block that has been used by the serving femto base station to communicate with the terminal (S435), and the serving femto base station transmits the radio resource information that has been assigned to the terminal, and then reassigns the relevant radio resource to exclude from the operating frequency (S440), and no longer uses the relevant radio resource to communicate with terminals accessed to the relevant femto base station. Here, the radio resource is referred to a radio resource area as much as the size that has been used for serving a terminal to be handed over among the operating frequencies of the serving femto base station. Then, the terminal transmits the resource reassignment information including the relevant radio resource information (S445). Subsequently, the serving femto base station transmits the arbitrated its own available radio resource area information to the femto-cell controller or core network (S450).

The terminal performs a handover (S455), and then transmits the radio resource information that has been transmitted to the terminal by the serving femto base station, to the target femto base station (S460).

The target femto base station adds the relevant radio resources to available radio resources based upon the radio resource information of the radio resources reallocation request message (S465), and uses available radio resources including the added radio resource to communicate with terminals being accessed. The target femto base station transmits the radio resource reassignment result to the terminal and femto controller (S470), and the femto controller updates the radio resource reassignment information (S475). The terminal resumes communication if the handover is finished, and notifies the target femto base station that the handover has been successfully completed, and the target femto base station notifies the serving femto base station that the handover has been successfully completed, and transmits an Ack signal to the terminal (S480).

However, the spirit of the invention is not limited to this embodiment, and the steps S475 and S480 can be replaced with each other in the order. In addition, without performing a process of requesting and responding radio resources assignment information to the serving femto base station by the terminal (S435, S445), the serving femto base station may directly send the radio resources assignment information through a handover command message (S430) when the terminal is handed over to a neighboring femto base station.

The method according to the present invention as described above may be implemented by software, hardware, or a combination of both. For example, the method according to the present invention may be stored in a storage medium (e.g., internal memory, flash memory, hard disk, and so on), and may be implemented through codes or instructions in a software program that can be performed by a processor such as microprocessor, controller, micro controller, ASIC (application specific integrated circuit), and the like.

Though preferred embodiments of present invention are exemplarily described as disclosed above, the scope of the invention is not limited to those specific embodiments, and thus various modifications, variations, and improvements can be made in the present invention without departing from the spirit of the invention, and within the scope of the appended claims. For example, a method for communicating with a femto base station is applicable to other systems in addition to the foregoing system.

The invention claimed is:

1. A method for arbitrating radio resources assigned to a terminal by a serving femto base station, the method comprising:
   assigning, to the terminal by the serving femto base station, a radio resource of the serving femto base station to provide a communication service at a desired Quality of Service (QoS) of the terminal;
   transmitting, to a network entity by the serving femto base station, first information when the terminal is handed over from the serving femto base station to a target femto base station, the first information including a number of radio blocks (RBs) for indicating a size of the radio resource previously assigned to the terminal by the serving femto base station; and
   upon a determination of a minimum size of a target femto base station radio resource corresponding to the desired QoS and a further determination that the target femto base station does not have an available radio resource corresponding to the desired QoS, excluding, by the serving base station, the radio resource previously assigned to the terminal from the serving femto base station so that the target femto base station may use the radio resource previously assigned to the terminal from the serving femto base station.

2. The method of claim 1, further comprising:
   receiving a measurement result for neighboring femto base stations from the terminal;
   determining whether or not the terminal is to be handed over to the target femto base station based upon the measurement result; and
   transmitting a handover request message to the target femto base station when the serving base station determines that the terminal is to be handed over to the target femto base station.

3. The method of claim 1, further comprising:
   receiving a response message from the network entity in response to the transmitted first information on the radio resource assigned to the terminal by the serving femto base station.

4. The method of claim 3, wherein the response message indicates that the radio resource assigned to the terminal by the serving femto base station is moved to the target femto base station.

5. The method of claim 1, wherein the network entity includes at least one of a femto base station controller, the terminal, the target femto base station, and a core network.

6. A method for arbitrating radio resources assigned to a terminal by a target femto base station, the method comprising:
receiving, by the target femto base station from a serving femto base station, a message for requesting handover of the terminal from the serving femto base station to the target femto base station;
receiving, by the target femto base station from a network entity, first information, the first information including a number of radio blocks (RBs) for indicating a size of a radio resource of the serving femto base station previously assigned to the terminal,
upon a determination of a minimum size of a target femto base station radio resource corresponding to the desired QoS and a further determination that the target femto base station does not have the available radio resource corresponding to the desired QoS, expanding, by the target femto base station after the terminal is handed over to the target base station, the radio resource assigned by the target femto base station into a radio resource previously assigned to the terminal by the serving femto base station.

7. The radio resources arbitration method of claim 6, further comprising:
transmitting information including that the radio resource previously assigned to the terminal by the serving femto base station is reallocated to the network entity.

8. The radio resources arbitration method of claim 7, wherein the transmitted information further includes radio resource reallocation information for the neighboring femto base station.

9. A serving femto base station configured to arbitrate radio resources assigned to a terminal, the serving femto base station comprising:
a transmitter; and
a processor configured to:
assign, to the terminal, a radio resource of the serving femto base station to provide a communication service at a desired Quality of Service (QoS) of the terminal;
transmit, to a network entity, first information when the terminal is handed over from the serving femto base station to a target femto base station, the first information including a number of radio blocks (RBs) for indicating a size of the radio resource previously assigned to the terminal by the serving femto base station,
upon a determination of a minimum size of a target femto base station radio resource corresponding to the desired QoS and a further determination that the target femto base station does not have an available radio resource corresponding to the desired QoS, exclude the radio resource previously assigned to the terminal from the serving femto base station so that the target femto base station may use the radio resource previously assigned to the terminal from the serving femto base station.

* * * * *